United States Patent [19]

Kaite

[11] Patent Number: 4,614,975

[45] Date of Patent: Sep. 30, 1986

[54] FOCUS AREA CHANGE CIRCUIT

[75] Inventor: Osamu Kaite, Neyagawa, Japan

[73] Assignee: Sanyo Electric Co., Ltd., Moriguchi, Japan

[21] Appl. No.: 791,004

[22] Filed: Oct. 24, 1985

[30] Foreign Application Priority Data

Oct. 26, 1984 [JP] Japan .......................... 59-162656[U]

[51] Int. Cl.⁴ ........................ G03B 3/00; H04N 5/232
[52] U.S. Cl. .................................... 358/227; 354/402
[58] Field of Search ................. 358/227; 352/140; 354/400, 402, 403, 409, 195.1, 195.13, 199, 432

[56] References Cited

U.S. PATENT DOCUMENTS 4,303,322  12/1981  Someya ............................. 354/432
4,320,419  3/1982  Hanma et al. ................. 354/195.1

*Primary Examiner*—Russell E. Adams

*Attorney, Agent, or Firm*—Armstrong, Nikaido, Marmelstein & Kubovcik

[57] ABSTRACT

A focus area change circuit is provided with a vertical comparator (50) which compares coincidence of count values of a vertical counter (45) with designated vertical positions of a focus area and a horizontal comparator (51) which compares count values of a horizontal counter 49 with designated horizontal positions. A sampling pulse generator (52) generates sampling pulses on the basis of vertical and horizontal comparison outputs, which are respectively expanded for generating expansion sampling pulses. A selection circuit (56) selects the sampling pulses or the expansion sampling pulses so that a sampling circuit (32) samples outputs of a video camera on the basis of the sampling pulses or the expansion sampling pulses as selected. A focus motor is controlled to maximize the sampling outputs. Thus, the sampling pulses or the expansion sampling pulses are selected in response to the state of the object of image formation, thereby to enable selection of the focus area.

6 Claims, 10 Drawing Figures

FOCUS AREA CHANGE CIRCUIT

BACKGROUND OF THE INVENTION

1. Field of the Invention

The present invention relates to a focus area change circuit. More specifically, it relates to a focus area change circuit which changes a focus area designated for controlling the focus of a video camera.

2. Description of the Prior Art

Video signals obtained through a video camera are maximized in amount of change in an in-focus state. Therefore, proposed is a method of controlling the focus of a video camera by sampling video signals to detect luminance level change and levels of high-frequency components of luminance signals.

Figure 1:
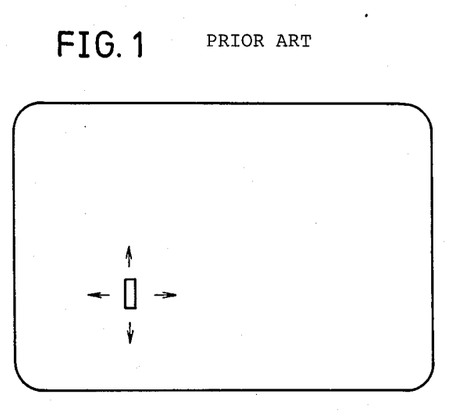
FIG. 1 is a diagram for illustrating a display mode of a conventional focus control position display circuit.
Figure 2:
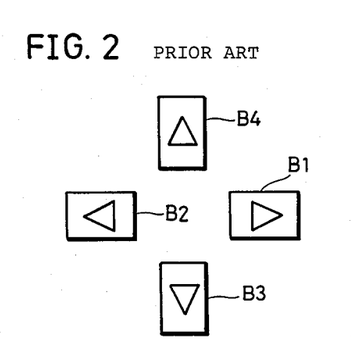
FIG. 2 shows arrangement of pushbutton switches in the focus control position display circuit.
Figure 3:
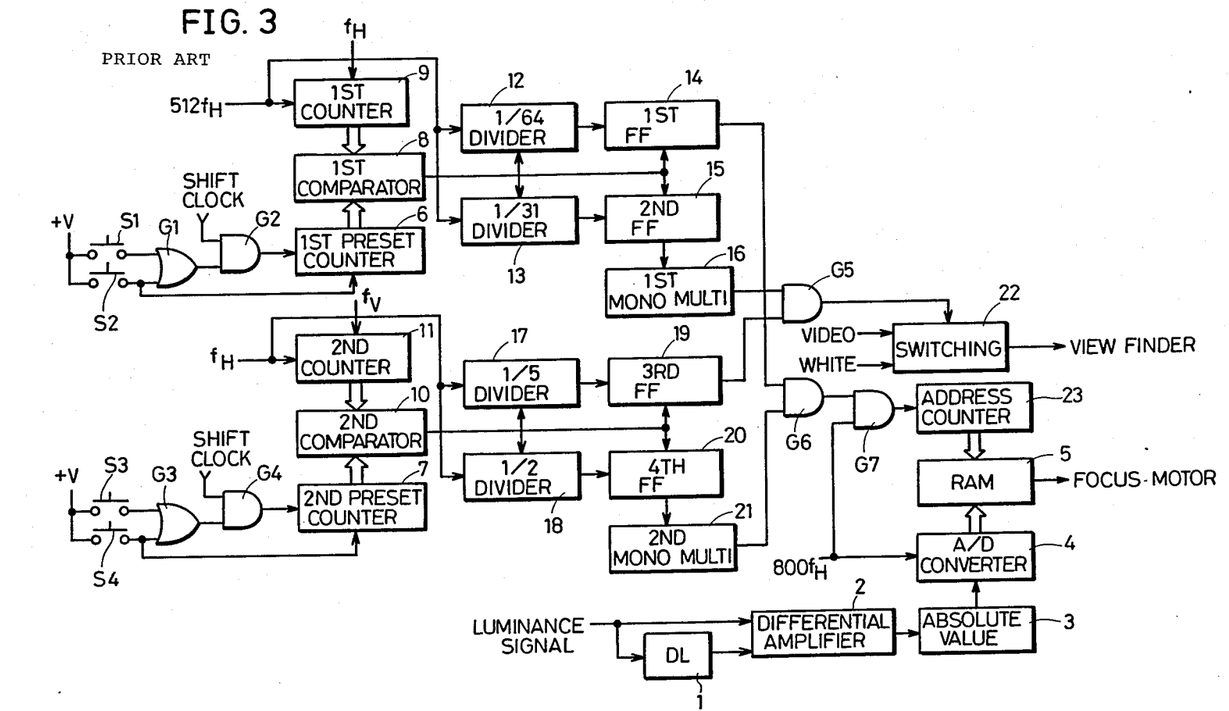
FIG. 3 is a block diagram showing the conventional focus control position display circuit.

FIG. 1 illustrates a display mode of a conventional focus control position display circuit and FIG. 2 illustrates arrangement of pushbutton switches of the conventional focus control position display circuit, while FIG. 3 is a block diagram showing the conventional focus control position display circuit.

With reference to FIGS. 1 to 3, description is now made on the structure and operation of the conventional focus control position display circuit. The focus control position display circuit as shown in FIGS. 1 to 3 is adapted to switch a focus control position at desire by manipulating four pushbutton switches B1, B2, B3 and B4 respectively corresponding to vertical and horizontal directions of movement. In the example as shown in FIGS. 1 to 3, a video camera for recording still pictures has a focus control function to set the focus control position in advance to recording and the focus control position is displayed on an electronic view finder associated with the same, and sample prescribed video signals immediately before starting recording to move the focus lens to maximize change in the luminance level. Thereafter the video signals for one field are recorded on a prescribed track.

More concretely, luminance signals are supplied to a delay circuit 1 and one input end of a differential amplifier 2. The delay circuit 1 is adapted to delay the luminance signals by $1/800f_H$, to supply the delayed luminance signals to the other input end of the differential amplifier 2, which in turn supplies differential signals to an absolute value circuit 3. The absolute value circuit 3 performs full-wave rectification of the differential signals and the outputs thereof are converted into four-bit data of signals of $800f_H$. A RAM 5 stores the data for 100 samples.

The added value of the data stored in the RAM 5 is a barometer of the level change of the luminance signals, and a microcomputer (not shown) controls a focus control motor (not shown) to maximize the added value.

The aforementioned pushbutton switches B1 to B4 are pressed to close first to fourth switches S1 to S4 thereby to enable preset of sampling positions. Namely, the first switch S1 is closed to supply a shift clock pulse of 100 Hz to a first presetable counter 6, thereby to count up the same. The second switch S2 brings the first presetable counter 6 in a downcount mode while supplying a shift clock pulse to the first presetable counter 6 thereby to count down the same.

In a similar manner, the third switch S3 brings a second presetable counter 7 in an upcount mode while the fourth switch S4 counts down the second presetable counter 7. The preset value of the first presetable counter 6 defines the focus control position in the horizontal direction and the preset value of the second presetable counter 7 defines the focus control position in the vertical direction.

The preset value of the first presetable counter 6 is compared with the count value of a first counter 9 by a first comparator 8. The first counter 9 receives horizontal synchronizing signals of video signals as reset inputs while receiving signals 512 times the said horizontal synchronizing signals in frequency as count inputs. Thus, the first comparator 8 generates a first detection output when the preset value of the first presetable counter 6 coincides with the count value of the first counter 9.

The preset value of the second presetable counter 7 is compared with the count value of a second counter 11 by a second comparator 10. The second counter 11 receives vertical synchronizing signals as reset inputs while receiving the horizontal synchronizing signals as count inputs. Thus, the second comparator 10 generates a second detection output when the said preset value coincides with the count value of the second counter 11.

The first detection output generated from the first comparator 8 is supplied to a 1/64 frequency divider 12, a 1/31 frequency divider 13 and first and second flip-flops 14 and 15. The 1/64 frequency divider 12 and 1/31 frequency divider 13 are reset by the first detection output, while the first and second flip-flops 14 and 15 are set by the same. The 1/64 frequency divider 12 receives a signal of 512 $f_H$ as a count input, to supply an output signal to the first flip-flop 14 at the timing escaping a sampling range of about ⅛ in the horizontal direction, thereby to reset the first flip-flop 14. Thus, the first flip-flop 14 is turned to a high level in a sampling range of 100 data in the horizontal synchronizing interval. The 1/31 frequency divider 13 generates an output at the timing immediately ahead of the central point of the sampling range, thereby to reset the second flip-flop 15. At the fall timing of the second flip-flop 15, a first monostable multivibrator 16 is triggered to derive a high-level signal of certain width at the center of the sampling range.

In a similar manner, the second detection output from the second comparator 10 is supplied to a 1/5 frequency divider 17 and a ½ frequency divider 18 respectively as the reset input, as well as to third and fourth flip-flops 19 and 20 as the set input. The 1/5 frequency divider 17 is adapted to divide the horizontal synchronizing signal, thereby to reset the third flip-flop 19 by its division output. Thus, the third flip-flop 19 is turned to a high level by a period of 5H upon generation of the second detection output. In a similar manner, the ½ frequency divider 18 divides the horizontal synchronizing signal, to reset the fourth flip-flop 20 by its outputs. A second monostable multivibrator 21 is triggered at the fall timing upon reset of the fourth flip-flop 20, and the monostable period thereof is about 1H. Thus, the output of the second monostable multivibrator 21 is turned to a high level for a 1H period after a lapse of 2H from generation of the second detection output.

An AND gate G5 obtains the logical product of the respective outputs of the first monostable multivibrator 16 and the third flip-flop 19, to supply the same as a switching control input to a switching circuit 22. On the basis of the switching control input, the switching circuit 22 switches the video signals and white level output signals. The switching circuit 22 displays a white bar on the focus control position on the monitor screen.

The respective outputs from the first flip-flop 14 and the second monostable multivibrator 21 are supplied to an AND gate G6, which in turn obtains the logical product output which is turned to a high level in a sampling range of once per field. The output of the AND gate G6 is supplied to one input end of an AND gate G7, which obtains the logical product of the same and an 800 $f_H$ sampling signal received in the other input end, to supply its output to an address counter 23. The address counter 23 stores 100 data per A-D conversion by the A-D converter 4 while designating addresses of the RAM 5 by its count outputs.

In the conventional focus control position display circuit of the above structure, the pushbutton switch B1, B2, B3 or B4 is manipulated to close the contact of the switch S1, S2, S3 or S4 to select a desired area on the screen for controlling the focus, while displaying the selected area on the electronic view finder.

However, although the focus control area can be vertically or horizontally changed by manipulating the pushbutton switches B1 to B4, the range thereof cannot be expanded and hence the focus cannot be completely controlled in the aforementioned focus control position display circuit.

SUMMARY OF THE INVENTION

Accordingly, the principal object of the present invention is to provide a focus area change circuit which can control the focus of a video camera in a desired focus area by enabling selection of a prescribed focus area and an expanded focus area.

Briefly stated, the focus area change circuit according to the present invention compares count values of a vertical counter with designated vertical positions of a focus area while comparing count values of a horizontal counter with designated horizontal positions. Sampling pulses are generated on the basis of vertical and horizontal comparison outputs, which are respectively expanded to generate expansion sampling pulses. Either the sampling pulses or the expansion sampling pulses are selected to sample video signals outputted from the video camera. A focus control means is so controlled as to maximize the sampling outputs.

Thus, according to the present invention, the sampling pulses or the expansion sampling pulses are selected in response to the state of the object of image formation to select the prescribed focus area or the expanded focus area, thereby to enable change in the size of the focus area.

In a preferred embodiment of the present invention, a reset signal is generated when power supply is made or a reset switch is manipulated to initially set horizontal and vertical positions of the focus area. Thus, the focus area can be returned to the center of a screen when power supply is made or the circuit is reset.

In a more preferred embodiment of the present invention, the sampling pulses or the expansion sampling pulses are displayed on an electronic view finder in place of the video signals outputted from the video camera, in response to generation of the selected sampling pulses or expansion sampling pulses. Thus, the position and size of the area for controlling the focus can be easily recognized through the electronic view finder.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
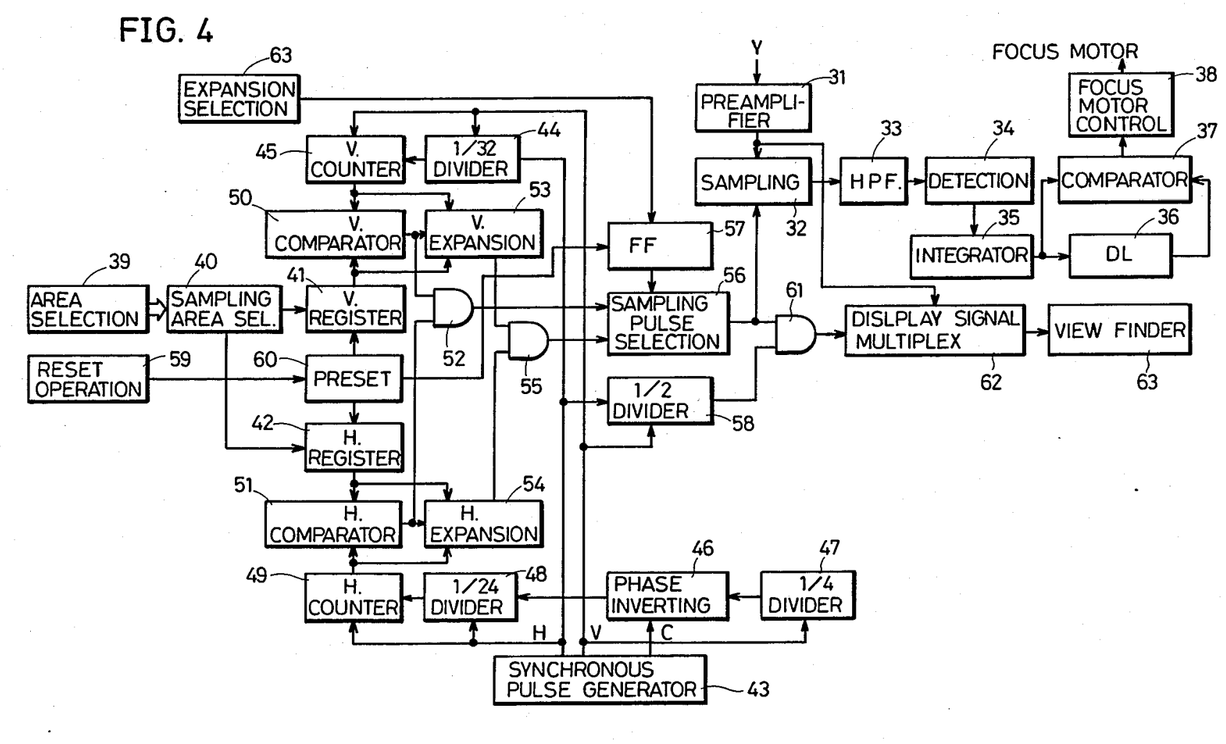
FIG. 4 is a block diagram showing entire structure of an embodiment of the present invention.
Figure 5:
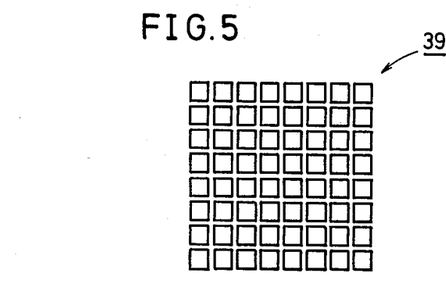
FIG. 5 illustrates area selection switches for selecting the focus area.
Figure 6:
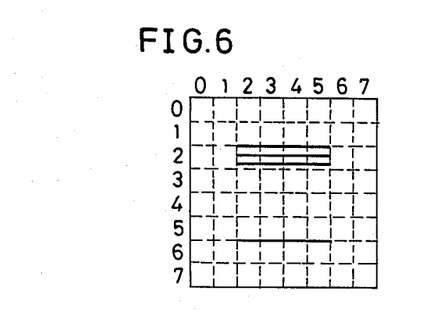
FIG. 6 is a diagram showing an example of display on an electronic view finder.

FIG. 4 is a block diagram showing entire structure of an embodiment of the present invention and FIG. 5 is a diagram showing area selection switches for selecting the focus area while FIG. 6 is a diagram for illustrating an example of display on an electronic view finder.

With reference to FIGS. 4 to 6, description is now made on the structure and operation of the embodiment of the present invention.

In the embodiment of the present invention, the screen is formed by 8×8=64 blocks, and a sampling area is determined by selecting either a small basic sampling area formed by 2×2 blocks or an expanded sampling area formed by 4×4 blocks, as shown in FIG. 6. FIG. 6 typically shows the state of sampling area display in which the expanded sampling area is selected at the center of the screen.

As shown in FIG. 5, an area selection means 39 is formed by 64 selection switches arranged in the form of a matrix on the side surface of a video camera. Selection outputs from the area selection means 39 are decoded by a sampling area selection circuit 40, which in turn supplies three-bit decoding outputs to a vertical register 41 and a horizontal register 42. The vertical and horizontal registers 41 and 42 are three-bit registers, which determine the position of the upper right block of the sampling area.

On the other hand, a synchronous pulse generator 43 generates vertical blanking pulses V including vertical synchronizing signals, horizontal blanking pulses H including horizontal synchronizing signals and color subcarrier signals C. The horizontal blanking pulses H are supplied for 1/32 frequency division to a 1/32 frequency divider 44, outputs of which are supplied to a vertical counter 45 as count input signals. The 1/32 frequency divider 44 and the vertical counter 45 are reset by the vertical blanking pulses V. The vertical counter 45 is formed by three bits, to vertically count the blocks on the screen per field synchronously with the video signals.

The vertical blanking pulses V are frequency-divided by a ¼ frequency divider 47 to be supplied to a phase inverter 46, which receives the color subcarrier signals C from the synchronous pulse generator 43. In view of phase inversion of the color subcarrier signals C per frame, the phase inverter 46 inverts the phases of the color subcarrier signals C in a frame period, thereby to invert and control the outputs from the aforementioned ¼ frequency divider 47. The outputs thus phase-inverted by the phase inverter 46 are supplied to a 1/24 frequency divider 48. The 1/24 frequency divider 48 divides the color subcarrier signals C, to supply its division outputs to a three-bit horizontal counter 49. The horizontal counter 49 horizontally counts the blocks per horizontal scanning operation synchronously with the video signals.

The phase inverter 46 and the ¼ frequency divider 47 are provided in view of the display mode of the sampling area according to the embodiment of the present invention, and are not particularly required for focus control.

The count outputs from the vertical counter 45 and the outputs from the vertical register 41 are supplied to a vertical comparator 50. The vertical comparator 50 compares the count outputs of the vertical counter 45 with the outputs of the vertical register 41, to detect the row of blocks designated by the vertical register 41 and a subsequent row of blocks. The count outputs of the horizontal counter 49 and the outputs of the horizontal register 42 are supplied to a horizontal comparator 51, which in turn detects the column of blocks designated by the horizontal register 42 and a subsequent column of blocks.

The comparison outputs from the vertical and horizontal comparators 50 and 51 are supplied to an AND gate 52, which in turn obtains logical products of the vertical and horizontal comparison outputs thereby forming a sampling pulse generator for generating basic sampling pulses. The basic sampling pulses correspond to the basic sampling area of 2×2 blocks on the screen.

A vertical expansion circuit 53 receives the count outputs from the vertical counter 45 and the outputs from the vertical register 41, thereby to generate vertical expansion outputs for vertical four blocks doubled in pulse width of the vertical comparison outputs. A horizontal expansion circuit 54 receives the count outputs from the horizontal counter 49 and the outputs from the horizontal register 42, thereby to generate horizontal expansion outputs for horizontal four blocks doubled in pulse width of the horizontal comparison outputs. The outputs from the vertical and horizontal expansion circuits 53 and 54 are supplied to an AND gate 55, which forms an expansion sampling pulse generator means for generating expansion sampling pulses on the basis of the logical products of the vertical and horizontal expansion outputs. The expansion sampling pulses correspond to the expanded sampling area of 4×4 blocks on the screen.

Figure 7:
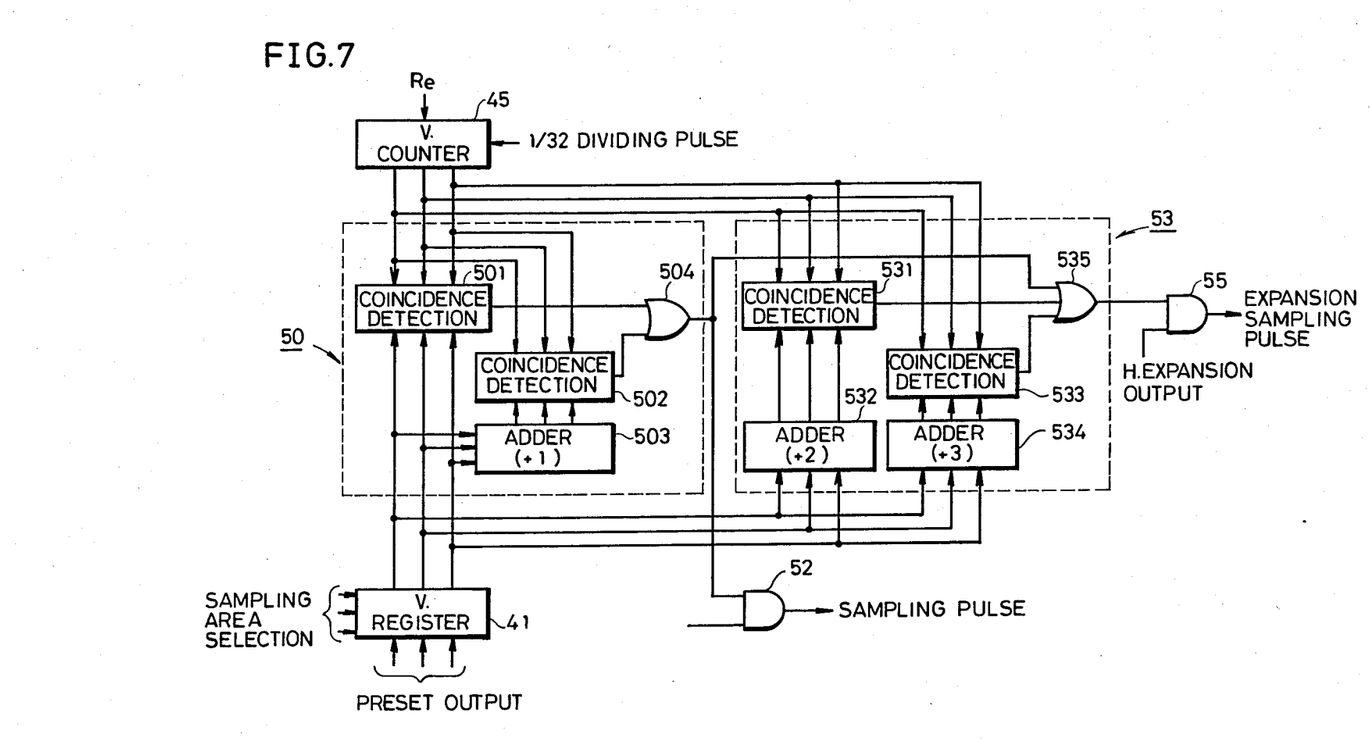
FIG. 7 is a circuit diagram showing essential parts of a vertical comparator and a vertical expansion circuit as shown, in FIG. 4.
Figure 8:
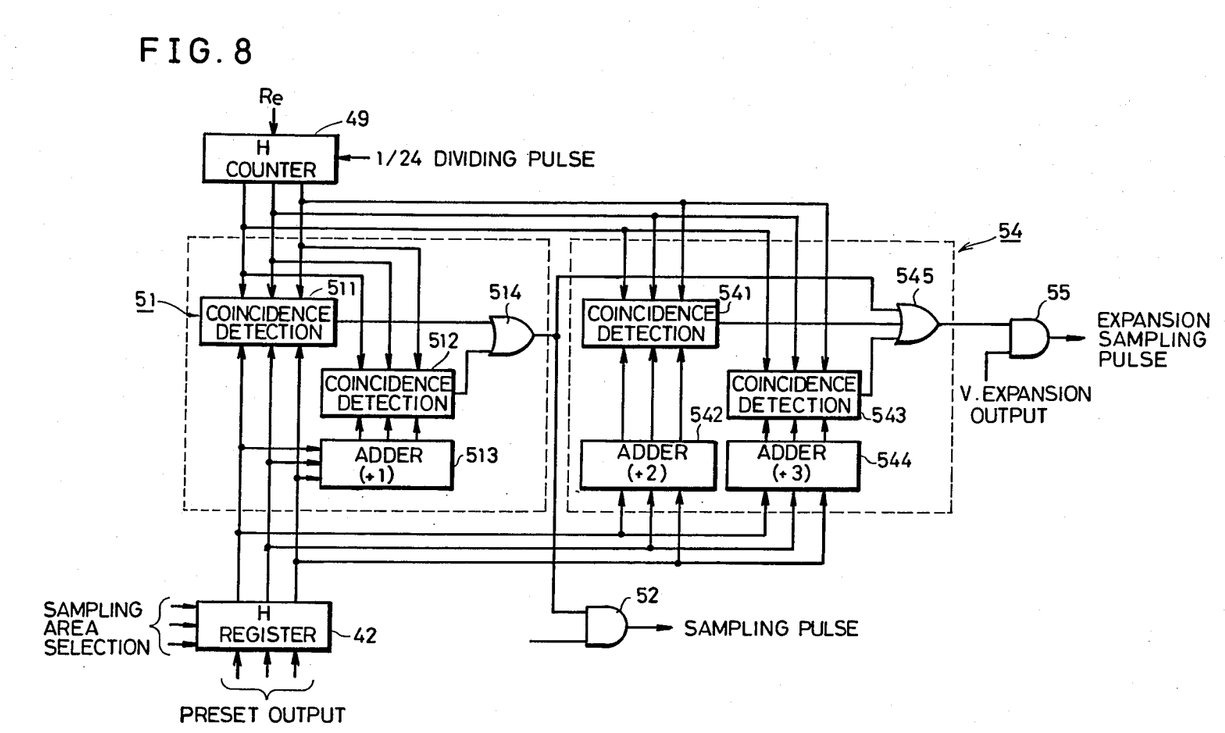
FIG. 8 is a circuit diagram showing essential parts of a horizontal comparator and a horizontal expansion circuit as shown in FIG. 4.

FIG. 7 is a circuit diagram showing essential parts of the vertical comparator 50 and the vertical expansion circuit 53 as shown in FIG. 4, and FIG. 8 is a circuit diagram showing essential parts of the horizontal comparator 51 and the horizontal expansion circuit 54.

With reference to FIG. 7, more detailed description is made on the structure and operation of the vertical comparator 50 and the vertical expansion circuit 53. As shown in FIG. 7, the vertical comparator 50 is formed by a first coincidence detection circuit 501, a second coincidence detection circuit 502, a first adder 503 and an OR gate 504. The first coincidence detection circuit 501 receives the count outputs from the vertical counter 45 and the outputs from the vertical register 41. The second coincidence detection circuit 502 receives the count outputs of the vertical counter 45 and the outputs of the adder 503, which adds "1" to the outputs of the vertical register 41.

Thus, the first coincidence detection circuit 501 outputs a first coincidence signal when vertical blocks designated by the vertical register 41 coincide with the count outputs of the vertical counter 45, while the second coincidence detection circuit 502 outputs a second coincidence signal when blocks subsequent to the said blocks corresponding to the outputs of the vertical register 41 coincide with the count outputs of the vertical counter 45. Therefore, the coincidence outputs from the first and second coincidence detection circuits 501 and 502 are generated in a continued manner. The first and second coincidence outputs are supplied to the OR gate 504, which in turn derives vertical comparison outputs corresponding in pulse width to vertical positions of the blocks stored in the vertical register 42 and the subsequent blocks.

The vertical expansion circuit 53 is formed by a third coincidence detection circuit 531, a second adder 532, a fourth coincidence detection circuit 533, a third adder 534 and an OR gate 535. The third coincidence detection circuit 531 compares the count outputs of the vertical counter 45 with the outputs of the second adder 532 which adds "2" to each output of the vertical register 41, thereby to output a third coincidence signal. The fourth coincidence detection circuit 533 compares the count outputs of the vertical counter 45 with the outputs of the third adder 534 which adds "3" to the outputs of the vertical register 41, to generate a fourth coincidence signal.

Thus, the third coincidence signal is generated subsequently to the second coincidence signal outputted from the second coincidence detection circuit 502 included in the vertical comparator 50, and the fourth coincidence signal is generated subsequently to the third coincidence signal. The third and fourth coincidence signals and the outputs of the OR gate 504 included in the vertical comparator 50 are supplied to an OR gate 535. Thus, the OR gate 535 generates vertical expansion signals corresponding in pulse width to four rows including that of the blocks designated by the vertical register 41. The upper output limit is "7" in each of the first, second and third adders 503, 532 and 534.

The vertical comparator 50 and the vertical expansion circuit 53 are structured in the aforementioned manner, thereby to derive the vertical comparison outputs and the vertical expansion outputs twice the same.

As shown in FIG. 8, the horizontal comparator 51 and the horizontal expansion circuit 54 are structured similarly to the vertical comparator 50 and vertical expansion circuit 53. The horizontal comparator 51 includes coincidence detection circuits 511 and 512, an adder 513 and an OR gate 514, and the horizontal expansion circuit 54 includes a coincidence detection circuit 541, an adder 542, a coincidence detection circuit 543, an adder 544 and an OR gate 545. The horizontal comparator 51 and horizontal expansion circuit 54 operate in a similar manner to the vertical comparator 50 and vertical expansion circuit 53, and detailed description thereof is omitted.

Referring again to FIG. 4, the sampling pulse selection circuit 56 receives the basic sampling pulses generated from the AND gate 52 and the expansion sampling pulses generated from the AND gate 55. The sampling pulse selection circuit 56 selects either the former or the latter by the outputs from the flip-flop 57, to supply the selected pulses to the aforementioned sampling circuit 32 as sampling pulses. On the basis of the sampling pulses thus received, the sampling circuit 32 separates the luminance signals corresponding to the basic sampling area or the expansion sampling area for controlling the focus.

The flip-flop 57 receives outputs from an expansion selection means 63 including a area width set switch as trigger inputs. Thus, the outputs of the flip-flop 57 are inverted every time the area width set switch is pushed.

The selection pulses generated from the sampling pulse selection circuit 56 are supplied to one input end of an AND gate 61. The other input end of the AND gate 61 receives outputs from a ½ frequency divider 58. The ½ frequency divider 58 is reset by the vertical blanking pulses V, thereby to divide the horizontal blanking pulses H. Thus, the AND gate 61 supplies a display signal multiplex circuit 62 with the ½ frequency division outputs from the ½ frequency divider 58 as control inputs and only selection pulses on odd lines in respective fields. The display signal multiplex circuit 62 receives the luminance signals from a preamplifier 31, to set odd lines in the basic sampling area or the expanded sampling area in black levels.

Figure 9:
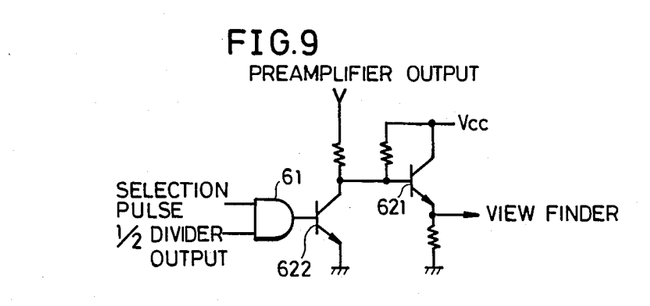
FIG. 9 is a circuit diagram showing an essential part of a display signal multiplex circuit as shown in FIG. 4.

FIG. 9 is a circuit diagram showing an essential part of the display signal multiplex circuit 62 as shown in FIG. 4, which is hereafter described in more detail.

The display signal multiplex circuit 62 includes first and second transistors 621 and 622. The first transistor 621 receives the luminance signals outputted from the preamplifier 31 in its base, and supplies multiplex signals to an electronic view finder 63 from its emitter. The base of the first transistor 621 is connected with the collector of the second transistor 622, which in turn receives the selection signals from the AND gate 61 in its base. In response to the selection signals, the second transistor 622 turns on/off the first transistor 621.

Thus, when the selection signals are outputted from the AND gate 61, the multiplex signals outputted from the first transistor 621 are at zero levels, i.e., black levels. Therefore, black thin lateral stripes are displayed in the basic sampling area or the expansion sampling area on the electronic view finder 63.

In order to replace the black stripes by white ones, the selection signals from the AND gate 61 may be directly inputted in the base of the first transistor 621, to bring the same in a saturation level. The divisional ratio of the ½ frequency divider 58 is not necessarily ½, and a 1/n frequency divider may be employed to be at a high level once for n lines.

The aforementioned structure enables setting of the position and size of the area for controlling the focus.

However, the basic sampling area or the expanded sampling area must be returned to the center of the screen when power supply is made or the circuit is reset. Therefore, a preset circuit 60 is provided in the embodiment of the present invention for initializing the same.

Figure 10:
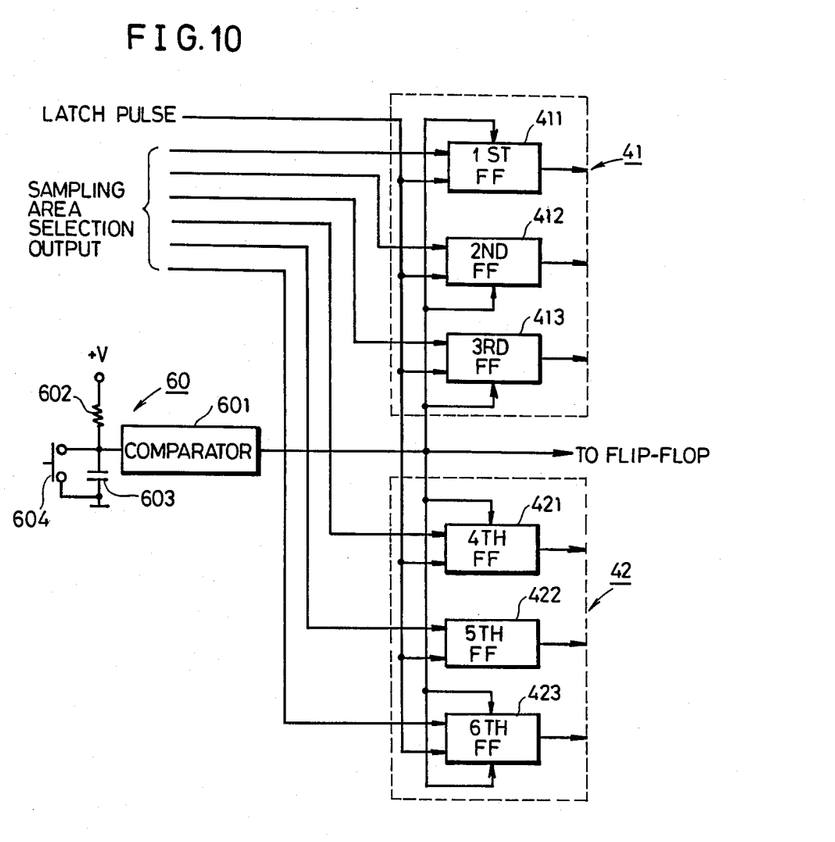
FIG. 10 is a circuit diagram showing essential parts of a preset circuit and vertical and horizontal registers as shown in FIG. 4.

FIG. 10 is a circuit diagram showing essential parts of the preset circuit 60 and the vertical and horizontal registers 41 and 42 as shown in FIG. 4. As obvious from FIG. 10, the vertical register 41 is formed by first, second and third flip-flops 411, 412 and 413, and the horizontal register 42 is similarly formed by fourth, fifth and sixth flip-flops 421, 422 and 423. The flip-flops 411 to 413 and 421 to 423 receive six-bit sampling area selection outputs as data inputs, to latch the selected positions in area selection by latch pulses derived by the area selection means 39.

A reset switch 604 forming a reset operation means defines a discharge path for a capacitor 603 in the preset circuit 60. The capacitor 603 forms an integrating circuit with a register 602 series-connected between the power source +V and the ground, and the contact between the register 602 and the capacitor 603 is connected with the input end of a comparator 601. Thus, the comparator 601 generates no output upon power supply until the integrating outputs reach a prescribed level, and outputs a preset signal in a delay by a prescribed period from the power supply. When the reset switch 604 is closed, the capacitor 603 is temporarily discharged, whereby the preset pulses are generated after a lapse of a prescribed period by the reset operation. The preset pulses are supplied to set input ends of the first and fourth flip-flops 411 and 421 and reset input ends of the second, third, fifth and sixth flip-flops 412, 413, 422 and 423 respectively.

Thus, "4" is preset as the outputs of the vertical and horizontal registers 41 and 42 respectively. The preset pulses simultaneously reset the flip-flop 57, so that the sampling pulse selection circuit 56 selects the sampling pulses. Consequently, selected by generation of the preset pulses is the basic sampling area formed by four blocks of (4, 4), (4, 5), (5, 4) and (5, 5) in two-dimensional coordinates as shown in FIG. 6.

Although the basic sampling area is selected in the initial reset in the above description, the expanded sampling area may be selected in place thereof. In other words, "3" may be preset in the vertical and horizontal registers 41 and 42 respectively, to set the flip-flop 57.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A focus area change circuit for changing a focus area of a video camera designated by focus control means for controlling the focus of said video camera, said focus change circuit comprising:

synchronous signal generator means (43) for generating vertical synchronizing signals, horizontal synchronizing signals, division signals obtained by dividing said horizontal synchronizing signals and multiplication signals obtained by multiplying said horizontal synchronizing signals;

a vertical counter (45) receiving said vertical synchronizing signals as reset inputs for counting said division signals of said horizontal synchronizing signals;

vertical position designating means (39, 40, 41) for designating vertical positions of said focus area;

vertical comparator means (50) for comparing count values of said vertical counter with said vertical positions designated by said vertical position designating means thereby to detect coincidence of the same;

a horizontal counter (49) receiving said horizontal synchronizing signals as reset inputs to count said multiplication signals of said horizontal synchronizing signals;

horizontal position designating means (39, 40, 42) for designating horizontal positions of said focus area;

horizontal comparator means (51) for comparing count values of said horizontal counter with said horizontal positions designated by said horizontal position designating means thereby to detect coincidence of the same;

sampling pulse generator means (52) for obtaining logical products of outputs from said vertical comparator means and those from said horizontal comparator means thereby to generate sampling pulses;

vertical expansion means (53) for expanding outputs from said vertical comparator means;

horizontal expansion means (54) for expanding outputs from said horizontal comparator means;

expansion sampling pulse generator means (55) for obtaining logical products of outputs from said vertical expansion means and those from said horizontal expansion means thereby to generate expansion sampling pulses;

sampling pulse selection means (56) for selecting either said sampling pulses generated from said sampling pulse generator means or said expansion sampling pulses generated from said expansion sampling pulse generator means;

sampling means (32) for sampling high frequency components of video signals outputted from said video camera on the basis of said sampling pulses or said expansion sampling pulses selected by said sampling pulse selection means; and focus driving means (38) for driving said focus control means to maximize the output level of said sampling means.

2. A focus area change circuit in accordance with claim 1, wherein said vertical position designating means includes:

vertical position selection switches (39, 40) provided in correspondence to respective said vertical positions of said focus area, and a vertical position register (41) for storing said vertical positions selected by said vertical position selection switches, and said horizontal position designating means includes:

horizontal position selection switches (39, 40) provided in correspondence to respective said horizontal positions of said focus area, and a horizontal position register (42) for storing said horizontal positions selected by said horizontal position selection switches.

3. A focus area change circuit in accordance with claim 2, further including:

initial reset signal generator means (60) for generating initial reset signals when electric power is supplied, and preset means (601) for setting initial values respectively in said vertical position register and said horizontal position register in response to said initial reset signals from said initial reset signal generator means.

4. A focus area change circuit in accordance with claim 3, further including a reset switch (604) for reset operation, said preset means including means (601) for setting initial values respectively in said vertical position register and said horizontal position register in response to manipulation of said reset switch.

5. A focus area change circuit in accordance with claim 1, wherein said vertical expansion means includes:

vertical adder means (532, 534) for adding up said vertical positions designated by said vertical position designating means and subsequent vertical positions, vertical expansion comparator means (531, 533) for comparing addition outputs obtained by said addition by said vertical adder means with said count values of said vertical counter to detect coincidence of the same, and vertical output means (535) for obtaining logical products of outputs from said vertical comparator means and outputs from said vertical expansion comparator means, and said horizontal expansion means includes:

horizontal adder means (542, 544) for adding up said horizontal positions designated by said horizontal position designating means and subsequent horizontal positions, horizontal expansion comparator means (541, 543) for comparing addition outputs obtained by said addition by said horizontal adder means with said count values of said horizontal counter to detect coincidence of the same, and horizontal output means (545) for obtaining logical products of outputs from said horizontal comparator means and said horizontal expansion comparator means and outputting the same.

6. A focus area change circuit in accordance with claim 1, further including:

display signal output means (62) for outputting said selected sampling pulses or expansion sampling pulses in place of said video signals from said video camera in response to output of said sampling pulses or expansion sampling pulses selected by said sampling pulse selection means, and an electronic view finder (63) provided in relation to said video camera to display images on the basis of said sampling pulses or expansion sampling pulses outputted from said display signal output means.

* * * * *